United States Patent Office 3,276,015
Patented Sept. 27, 1966

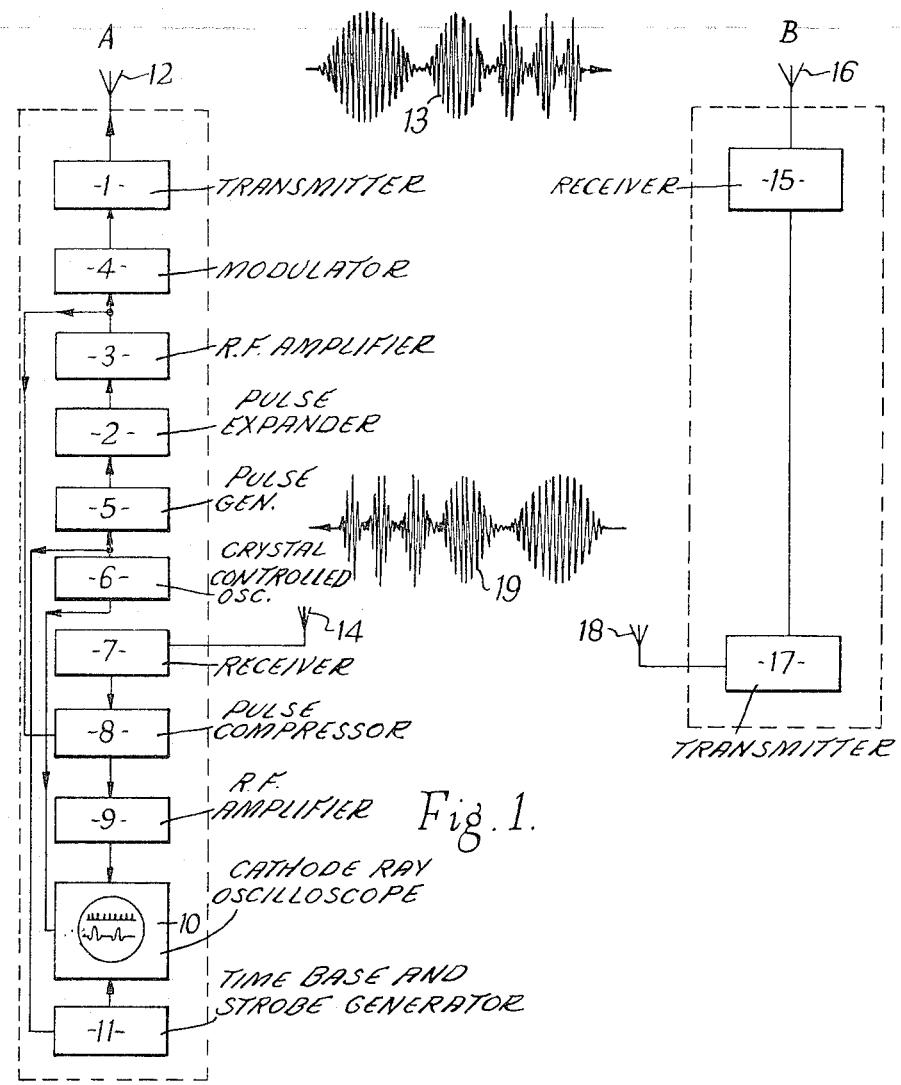

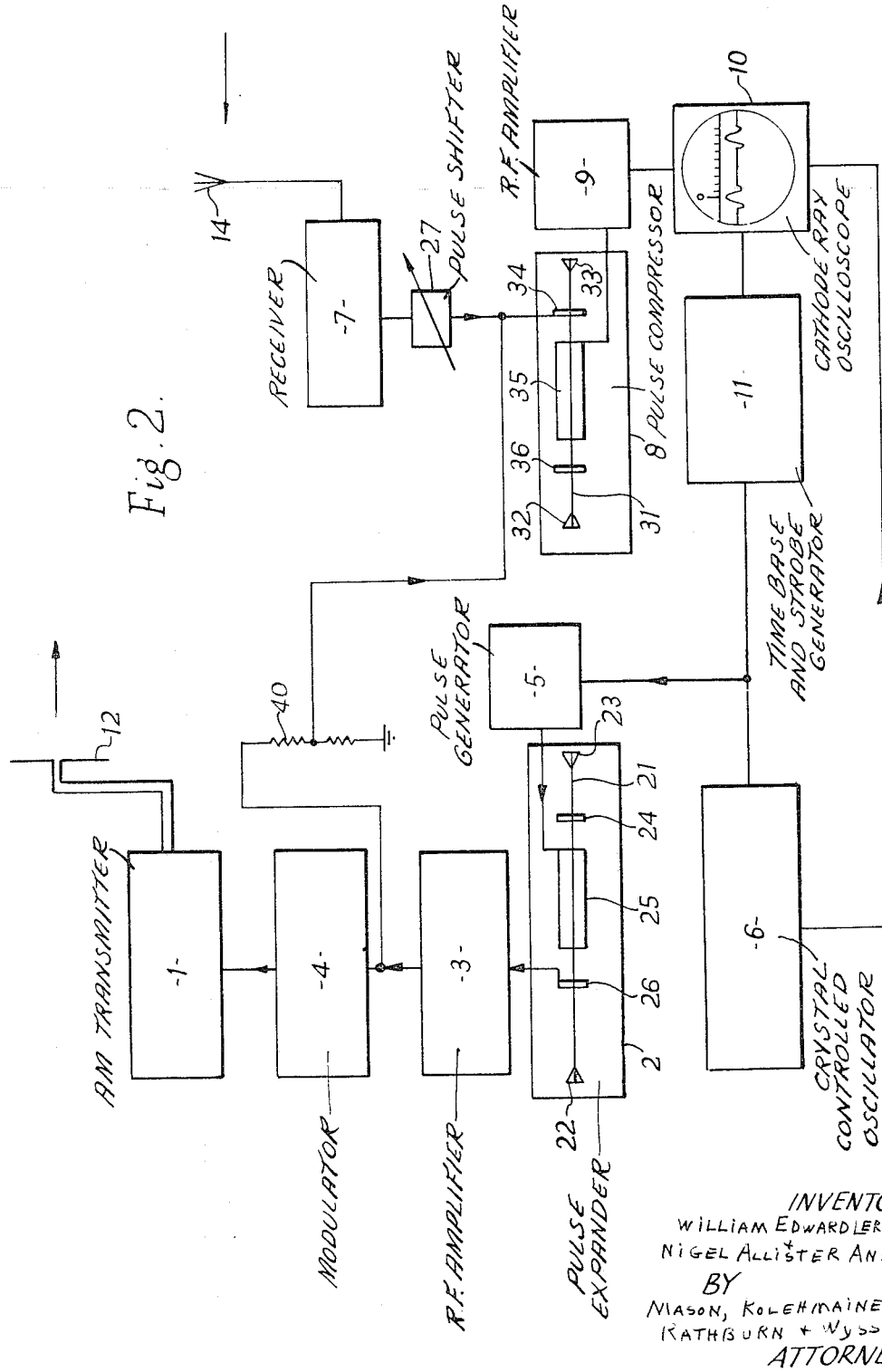

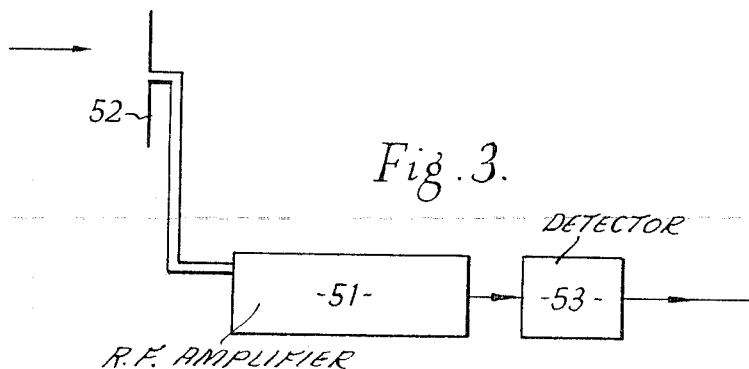
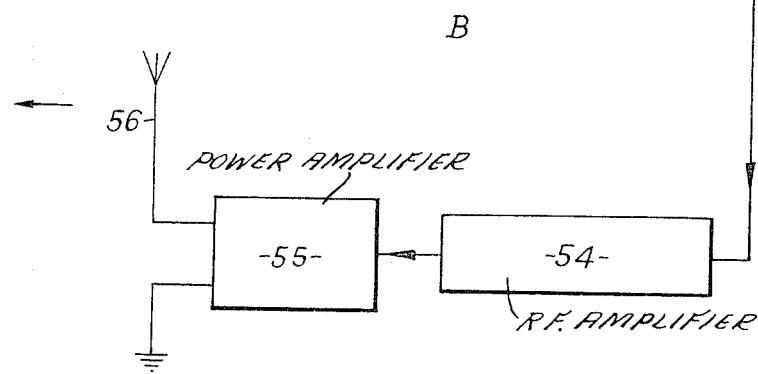
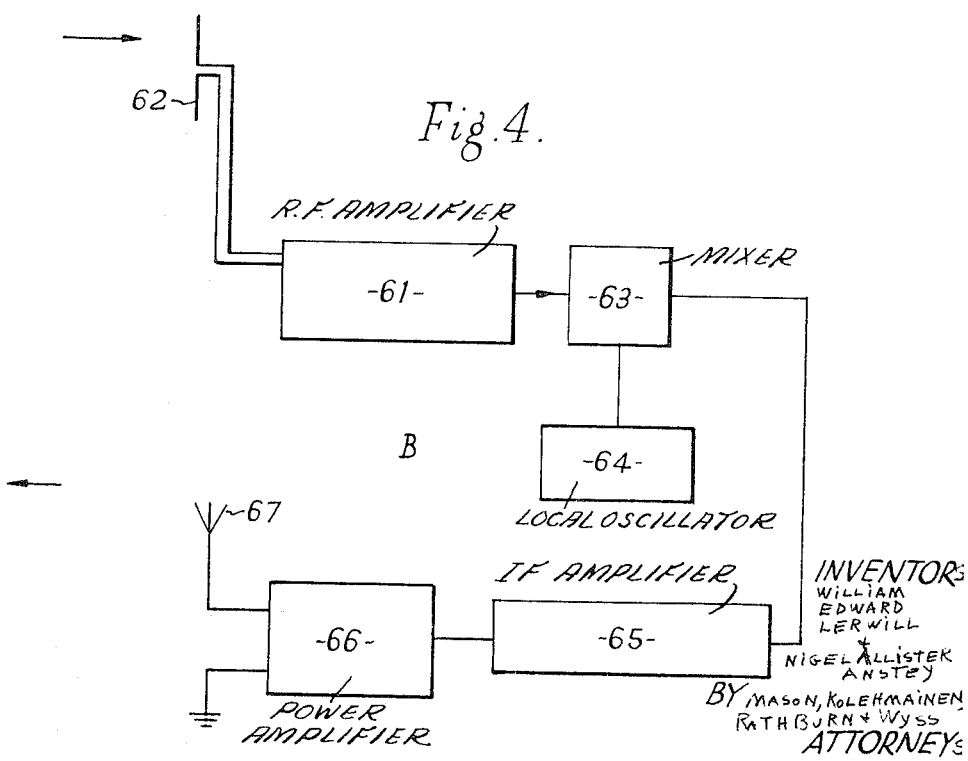

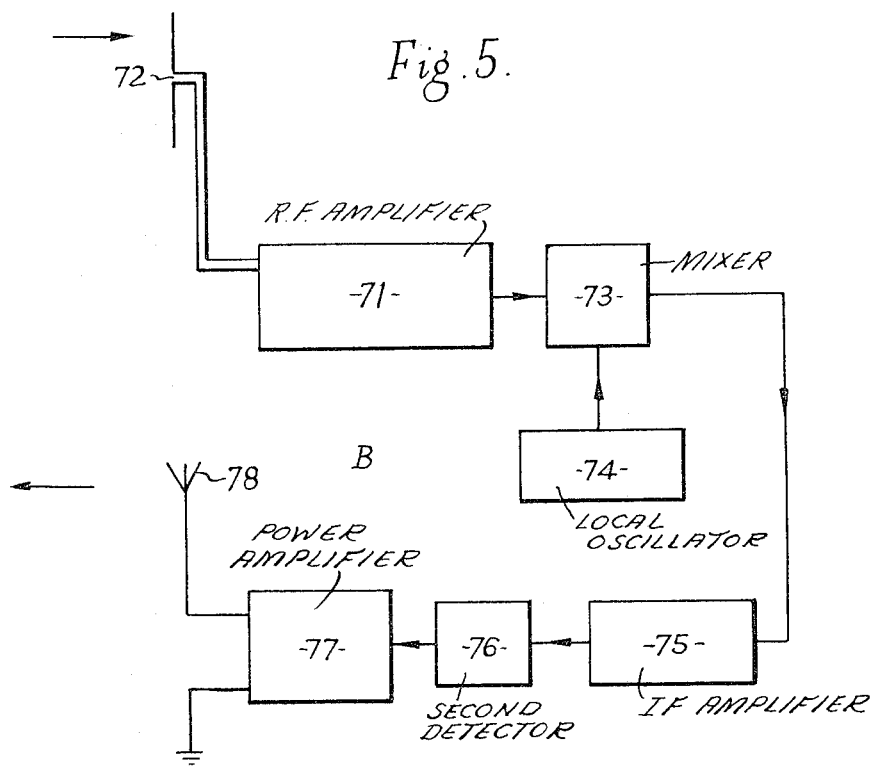

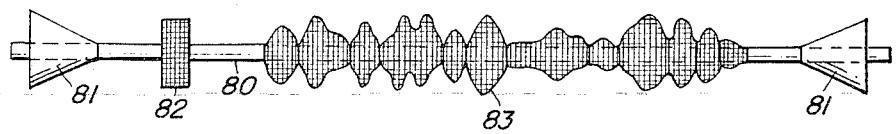
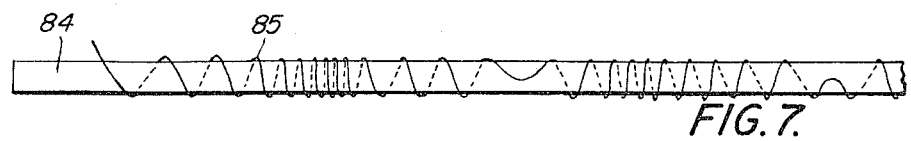
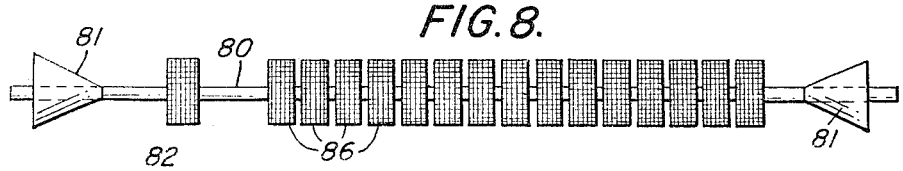
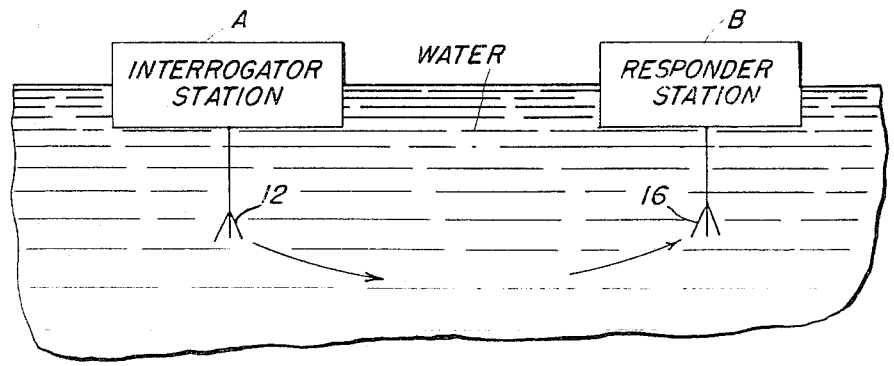

3,276,015
METHODS OF AND APPARATUS FOR
MEASURING DISTANCES
William Edward Lerwill, Keston, Kent, and Nigel Allister Anstey, Chelsfield, Kent, England, assignors to Seismograph Service Corporation, Tulsa, Okla.
Filed May 1, 1963, Ser. No. 277,278
Claims priority, application Great Britain, May 8, 1962, 17,628/62
13 Claims. (Cl. 343—6.5)

This invention relates to methods of and apparatus for measuring distances and in particular it is concerned with such measurements utilizing signals which are transmitted between two points the distance between which it is desired to determine, the signal from one point being used to trigger off the transmission of a reply signal from the other.

The invention is especially applicable to and will be more particularly described as applied to radio ranging systems in which electromagnetic waves, particularly ones at radio frequencies, are used for conveying the signals, although the invention is applicable to methods and systems in which signals are conveyed in other ways, such as by sonic waves, at least in one direction.

The measurement of the distance between two points by radio ranging and similar methods, as distinguished from echo ranging, involves the transmission of a signal from one point to another, at which latter point the receipt of the signal is used to trigger off a transmitter or responder which sends out a return signal. This is picked up at the first point and the distance between the two points is found by determining the time taken for the transmission of the two signals between the points. In the practical application of this method to radio ranging use is made of an interrogator at one point and a responder at the other, the interrogator normally being mounted in an aircraft or ship and the responder being provided at a fixed point or beacon.

The present invention is based on the use of an expanded pulse method of interrogation and it has amongst its objects the provision of a number of advantages over previous methods.

It is, accordingly, one of the objects of this invention to provide improved methods of and apparatus for measuring distances or ranges, by the use of which the efficiency and accuracy of measurement can be improved, as compared with previously used methods.

A further object of the invention is the provision of such methods and apparatus which make it possible to employ responders which can be constructed simply and economically and which can be arranged to operate unattended for considerable periods and with a moderate consumption of power.

The invention also has amongst its objects the provision of methods of and apparatus for measuring distances which offer other advantages as compared with those which have been known and used in the past.

An improvement in the accuracy of measurement is rendered possible by the present invention owing to a general simplification which can be made in the electronic circuits of the responders and by the elimination or reduction of certain variable delays which occur, particularly in short duration pulse circuits, as a result of amplitude discrimination and other causes.

Low power consumption radio beacons have been used for radio ranging in air to ground navigational aids. One example of such a system can be described as follows:

A relatively high power transmitter in the aircraft emits a 3 micro-second pulse envelope of high radio frequency (e.g. about 224 mc./s.) at a repetitive rate of 500 pulses per second. The peak power of this transmitter may be of the order of 1000 watts.

A remote beacon, which is tuned to this transmission, responds to a received pulse by re-radiating a pulse envelope of similar duration but at a slightly different carrier frequency. The peak power of this transmitter may be between 5 and 15 watts.

The instant of reception by the aircraft of this beacon pulse is compared with the instant of transmission of the corresponding tranmitted pulse, using a cathode ray tube display in the aircraft. The distance of the aircraft from the beacon is represented by the two-way travel time of the radio pulses, although allowance must be made for various delays in the system when calculating the distance. It is normal to calibrate the cathode ray tube time base in distance, making allowance for fixed system delays, so that a corrected range reading may be taken directly from the tube.

There remains at least one source of error which cannot be accurately allowed for on the ranging tube. This is a variable delay which occurs in the beacon, where the time taken for a pulse to reach the value necessary to trigger a secondary pulse generator varies with its peak amplitude. The threshold of the pulse generator can also vary with the value of the supply voltage. These delays, although not fatal to the system, are present in conventional beacons. They may be kept to a minimum by arranging for the rise time of the pulse to be short, which may be done by using the broadest bandwidth possible.

A ranging system using the above method can be used for position fixing relative to two beacons when the distance between the beacons is known. Furthermore, the area over which a position can be fixed is increased when several beacons are used. The geometry of the system can be arranged to provide the highest degree of position accuracy in the area of operation.

This method of position fixing is useful where it is required to carry out a short duration survey (such as a seismic survey) at sea, and the installation of more elaborate equipment is not economical.

A modified version of the method described above has been used at sea for position fixing during a short term seismic survey. In this case a maximum of 15 beacons were placed along the shore at 5 mile intervals. The ship's transmitter could then be tuned to interrogate the appropriate beacon and cause the beacon to re-radiate the reply pulse necessary for ranging. Range readings up to 12 miles to an accuracy better than ±50 yards could be relied upon from a 12 watt beacon, the maximum range being governed by the "line of sight" range between the ship and shore aerials.

The above use of the system demands that the beacons can be left unattended for several days, while yet maintaining a high standard of reliability; this is vital when the positions of the beacons are not easily accessible, such as in swamps, for example. The power consumed by the beacon must also be low to avoid the frequent need to replace batteries during operation, and the units must be small enough to allow several to be carried in a small vehicle or boat. The above considerations of power consumption and convenience of installation are ones which prevent the present system from being used at sea more often.

The present invention makes use of a pulse expansion and compression method of measurement, which provides a number of advantages, as compared with previously known systems.

The invention is concerned not only with improvements in the system as a whole but also with improvements in the interrogator and responder units, per se. Among the advantages which it provides or makes possible are a reduction in the peak power which is necessary in the responder beacon transmitters and the possible use of transistors in place of less efficient thermionic valves, with a consequent saving in power consumption.

The present invention is based primarily on the use for function generating or pulse expansion, and for pulse compression, of devices or networks known as correlators of a kind which are more fully described, and illustrated in the provisional and complete specifications of our British patent application No. 16,687/61 which were filed respectively on May 8, 1961 and May 8, 1962 and in our United States applications Serial No. 190,912 and Serial No. 277,211, filed concurrently herewith and assigned to the same assignee as the present invention. Such correlators, which were designed for correlating two variables one of which includes a property which is represented by variations in an energy field as a function of distance and which is to be correlated with a property of the other variable, may be described as comprising a detector having a plurality of detecting elements which are arranged in space as a function of the said property of the second said variable and which are responsive to variations in the energy field of the first said variable to produce a corresponding output, the output of the detecting elements being combined to produce a detected output which represents a correlation of the two variables. Furthermore, as is explained in the said applications, such correlators can also be used in an opposite sense, to produce a similar correlation, by supplying to the said detector an input which represents the said property of the first said variable whereby the detector is caused to generate an energy field which represents the correlation of the two variables and from which a corresponding output is obtained by suitable means.

The present invention, in one of its important aspects, is based on the use, in an interrogator which is used in conjunction with a responder for the measurement of distance, of two such correlators, one of which is arranged to expand a pulse supplied to it in order to produce an expanded pulse signal which is transmitted by the interrogator, and the other of which correlators is used as a pulse compressor which is arranged to compress the pulse signal which is received back from the responder, in order that the two signals can be compared and their combined transmission time obtained, which time provides a measurement of the distance between the interrogator and the responder.

The invention is also concerned with other improvements in the interrogator and responder.

The above and other important objects, features and advantages of the present invention will appear from the following description, which will be given by way of example. Reference will be made to the accompanying drawings, in which:

FIGURE 1 is a general diagrammatic view showing one method of an apparatus for measuring the distance between two points A and B, using an interrogator and a responder;

FIGURE 2 is a more detailed but still diagrammatic view showing parts of the interrogator which is shown in FIGURE 1;

FIGURES 3, 4 and 5 are diagrammatic views showing three different responder units, any one of which may form part of the system shown in FIGURE 1 and may be used with the interrogator of FIGURE 2;

FIG. 6 shows diagrammatically a magnetostrictive correlator device which may be used at the interrogator station shown in FIGS. 1 and 2;

FIG. 7 is an extended view illustrating a feature of the device shown in FIG. 6;

FIG. 8 is a view similar to FIG. 6 but shows a modified correlator device which may be used in the practice of the invention; and FIG. 9 is a diagrammatic view illustrating an underwater system for practicing the invention.

FIGURE 1 illustrates the general principle of the present invention, in one of its applications, in the form of a simplified block diagram, the object being to measure by radio ranging the distance between two units A and B one of which, the unit A, is an interrogator and the other of which, the unit B, is a responder. One of these units will be mobile, being provided, for example, on a ship or aircraft, while the other will generally be fixed, being provided in the form of a responder beacon, but the invention is not limited to this arrangement. For example, both of the units could be mobile or the responder could be provided as a mobile unit, the interrogator being located at a fixed position.

It should be noted that, although only one responder is shown in FIGURE 1, a single interrogator can be used with a number of responder beacons for accurate position finding.

The interrogator A which is shown in FIGURES 1 and 2 comprises an amplitude modulated V.H.F. radio transmitter 1, a pulse expander 2 which feeds the transmitter 1 through a radio frequency amplifier 3 and a modulator 4, a pulse generator 5, which is supplied with a synchronizing signal from a crystal controlled oscillator 6, a radio receiver 7, a pulse compressor 8, a radio frequency amplifier 9 and a cathrode ray oscilloscope 10, which is provided with a time base and strobe-generator 11. The transmitter transmits, through a transmitting aerial 12, an interrogating signal in the form of an expanded pulse whose envelope may represent a swept-frequency waveform, such as is indicated diagrammatically at 13. The reply signal from the responder B is picked up by the receiving antenna 14 and fed to the receiver 7.

The responder B is shown in FIGURE 1 as comprising a radio receiver 15, which is connected to an antenna 16, and a radio transmitter 17, which is connected to a transmitting antenna 18, although, as will appear, the receiver and transmitter may be combined as a single unit.

The wave form of the reply signal which is transmitted by the responder B following on the receipt of the pulse 13 is indicated at 19.

FIGURE 2 shows the parts of the interrogator A in somewhat greater detail.

A pulse generator 5 is connected to the oscillator 6 which feeds it with synchronising pulses at a frequency which may, for example, be 500 c.p.s. These cause the pulse generator 5 to send out pulses of short duration to the pulse expander 2, which may be described as being a delay line generator. It comprises a rod, wire or tube 21 (hereinafter referred to as a delay member) which is made of a suitable magnetostrictive material. This is supported between two damping pads 22 and 23 which provide a matched resistive load for strain waves in the member 21 and which substantially eliminate reflections from the ends of the latter.

Surrounding the delay member 21 are three transducers 24, 25 and 26. The transducer 24 (which in this case is left idle) and the transducer 26 in each case consists of a single coil surrounding the delay member 21, but the transducer 25 consists of a number of transducer elements which are distributed or extend along the member 21. The transducer elements of the transducer 25 (which latter will be referred to as a "multiple transducer") may be represented by a number of separate windings or coils, which are connected together either in series or in parallel, or they may be formed by a single extended winding the turns of which are distributed along the delay member 21 to form the elements.

Magnetostrictive correlators which are constructed and which operate in a manner which is closely analogous to the delay line generators described above and which utilise the different forms of multiple transducer are more fully described in the complete specification and are shown in the drawings of our aforesaid British application No. 16,687/61 and United States application Serial No. 277,211, to which reference may be made. In a first form of such apparatus, as illustrated in FIG. 6, a delay member in the form of a rod, wire or tube 80 is first longitudinally magnetized so that its remanent magnetism lies on a suitable part of the B-H curve (or is maintained in this state by a suitably large external magnet). A launching transducer 82 surrounds the delay member 80 and comprises a simple coil of the wire so that a pulse of current through this coil produces a pulse of longitudinal strain in the delay member. This strain pulse travels in both directions along the delay member 80 at a velocity which is approximately 0.2 inch per microsecond. If the current through the launching transducer 82 is caused to vary in accordance with the function $r(t)$, a corresponding pattern of strain variations is transmitted down the delay member 80 and is finally absorbed in matching terminations 81 at the respective ends of the delay member. A second coil of wire similar to the coil 82 but spaced therefrom down the delay member 80 will have induced in it a voltage which represents a delayed and modified form of the function $r(t)$. This effect is known per se, and it represents one of the techniques used in conventional magnetostrictive delay line practice.

To apply this principle to the present invention, the detecting or pick-off transducer is not a simple coil as used in conventional practice, but is instead a long coil 83 having a length representing the duration of the function $g(t)$ (at the delay member velocity) and whose sensitivity is adjusted as a function of its length according to the function $g(t)$. The adjustment of the sensitivity can conveniently be effected by variations in the "turn density," or number of turns per unit length, of the coil. Separate coils must be used for the negative and positive half cycles of the function $g(t)$, or the winding direction must be reversed at every zero crossing of the function $g(t)$. An expanded diagrammatic illustration of the type of winding of the coil 83 is shown in FIG. 7, wherein a cylindrical former 84 is shown supporting a winding 85 of the type which reverses direction at the zero crossings.

This type of detector is appropriate to the case where the function $g(t)$ is well-known in advance, and is sufficiently important, or recurs sufficiently often, to warrant the winding of a special coil. Otherwise, as illustrated in the embodiment shown in FIG. 8, the long coil 83 may be replaced by a plurality of short coils 86 which are spaced continuously or at intervals along the delay member 80, and which have their contribution to the combined output programmed (by the addition of resistances or otherwise) according to the function $g(t)$. Such elementary coils (which may, for example, be cast in resin, complete with shield, in a form of a disk with a central hole for the delay member 80) may be assembled very readily, and their sensitivity may be programmed by a simple switched-resistor arrangement. The electrical configuration may involve series connection of the coils (in which shunt resistances are used) or parallel connection (in which case series resistors are used).

It is known in the art that the pulse shape obtained from an individual pick-off coil is a function of the length of the coil and the inductance and length of the launching coil. These variables may be simply adjusted to give an overall pulse shaping effect which approximates to double differentiation (see, for instance, "transistorized magnetostrictive delay line stores" by Showell, Barrow and Collis, AEI Engineering Review, July, 1960, pp. 58–67). Under these conditions the cross correlation function can be obtained by a double integration with respect to $\tau$.

The second form of magnetostrictive apparatus, which is otherwise similar in essence to the first, does not involve the overall magnetization of the delay member. In this form a local polarizing magnet is provided for the launching coil and also for the long detecting coil, or for each of the short coils which together make up the long detecting coil. Launching transducers of this type, and resin-cast individual short detecting coils are available commercially. A related technique involves electromagnetic biasing, achieved by the use of a standing direct current through the coils.

A third form of magnetostrictive apparatus involves the propagation of torsional (rather than longitudinal) strain pulses along the delay member; such torsional pulses are associated with a lower velocity. The apparatus is similar to those described above and shown in FIGS. 6 and 8, except that the magnetization of the delay member is circular rather than longitudinal. This magnetization may be maintained by the continuous passage of a direct current through the delay member 80 during operation. The launching and detecting coils are similar to those described for the first form; the longitudinal field of the launching coil combines with the circular field of the delay member to produce a helical field and delay member twists locally in response to this field.

The material used for the delay member must represent a good compromise between magnetostrictive properties (and their variation with temperature), pulse transmission properties (particularly attenuation and dispersion) and the temperature co-efficient of velocity. These considerations have been described in prior art literature, and alloys known as Nilo 45 and Permendur have been accepted as preferable to nickel.

It is sometimes necessary to introduced corrections to the function $g(t)$ before representing it by the sensitivity of the detecting coil. In the second form of the apparatus, described above, for instance, there is a very slight local change in the velocity of propagation (and its variation with temperature) when magnets are added to the delay member, and for accurate work the effective velocity must be determined with the pickoff transducers in position. There is also a loss associated with the normal propagation in the delay member, and an additional loss associated with the slight loading effect of the detecting coil; these losses can be measured and can be offset by appropriate compensation of the function $g(t)$. It is also possible to achieve pulse compression by feeding the signal $r(t)$ into the long transducer and by detecting the resulting disturbance at the short transducer.

Whichever form of multiple transducer 25 is used in the interrogator A the distribution of the transducer elements along it is calculated according to a certain function $g(t)$. The ouput of the pulse generator 5, which takes the form of pulses of short duration (for example about 1 microsecond) is supplied to the multiple transducer 25 and each pulse induces in the delay member 21 a strain pattern representing $g(t)$; this travels down the delay member 21 to the transducer 26. The transducer 26 will, as a result, generate an output in the form of an expanded pulse the wave form of which will correspond generally to $g(t)$.

From the transducer 26 the expanded pulse is fed to the amplifier 3 and thence to the modulator 4 the output of which is fed to the transmitter 1. It is then transmitted from the antenna 12 as an amplitude-modulated signal whose envelope represents an expanded pulse of varying frequency, the form of the expanded pulse being determined by the pattern and arrangement of the transducer elements in the multiple transducer 25. This transducer is so designed, in a manner which will be clear from the aforesaid British and United States applications, that the expanded pulse, which is fed to the transmitter 1 through the amplifier 3 and modulator 4, is in the form of a function having a frequency range of finite band width. It may be a linear sweep from a frequency $f_1$ to $f_2$ or a non-linear sweep from $f_1$ to $f_2$ or a random wave which contains some or all frequencies from $f_1$ to $f_2$.

The signal 13 transmitted by the transmitter 1 (which could be designed to transmit a frequency modulated instead of an amplitude modulated signal, if preferred), will have a duration corresponding to that of the expanded pulse from the transducer 26. The carrier frequency of the transmitter 1 should be many times greater than the highest modulating frequency $f_2$, as is the case in conventional radio practice by reason of considerations of tuning, selectivity, band width, etc.

The receiver 15 of the responder B FIGURE 1 is tuned to the radio frequency of the transmitter 1, while its band width is made equal to the band width of the transmitted signal. The received signal is fed to the transmitter 17 and is then re-transmitted by the latter back to the interrogator A at a frequency which may differ slightly or very widely from that of the transmitter 1. This will depend on a number of factors, including the type of responder used, as will be explained later.

The signal 19 which is picked up by the antenna 14 and fed to the receiver 7 is then fed by the latter through an adjustable phase corrector 27 (not shown in FIGURE 1) to the pulse compressor 8. This latter comprises a delay member 31, which is supported between damping pads 32 and 33, and three transducers 34, 35 and 36 all of which parts correspond to equivalent parts of the pulse expander 2, except that the transducer elements of the multiple transducer 35 may be modified, as compared with those of the multiple transducer 25, in order to introduce any necessary corrections.

It may be noted here that the form $r(t)$ of the received signal which is supplied by the receiver 7 to the pulse compressor 8 would correspond exactly to the signal $g(t)$ from the expander 2 if it were not for phase and other distortions introduced by parts of the interrogator (for example by the amplifier 3) and of the responder. A method of minimising the effect of phase shift, particularly in the amplifier 3, is shown in FIGURE 2.

Using a potential divider 40 a proportion of the output of the amplifier 3 is fed to the transducer 34 of the pulse compressor 8. Any phase distortion of the signal which is supplied by the amplifier 3 to the transmitter 1 can be compensated by adjusting the relative positions of the transducer elements of the multiple transducer 35 in the pulse compressor 8. In this way a pulse, which is used to indicate zero time on the time base of the oscilloscope 10, can be adjusted so as to be symmetrical about a clearly defined peak.

Phase distortion which is introduced by the responder B can be corrected by adjustment of the phase shift unit 27.

The strain wave which is induced in the delay member 31 by the transducer 34 will represent the received signal $r(t)$ and it will induce in the multiple transducer 35 an output which represents a cross-correlation of $r(t)$ and $g(t)$, the object being to compress the width of the expanded pulse $r(t)$ to that of the original pulse from the pulse generator 5.

The compressed pulse, after passing through the wideband amplifier 9, is fed to the oscilloscope 10 from which the travel time can be read. To do this the sweep circuit of the time base of the oscilloscope 10 is synchronised with the repetitive frequency of the pulse generator 5 by means of synchronizing pulses which are supplied to the time base and strobe generator 11, while the oscilloscope is supplied with calibration pips (which may, for example, have a frequency of 1.5 mc./s.) from the oscillator 6.

From the oscilloscope 10 the two-way travel time of the expanded pulse can be measured and the distance between A and B calculated on the basis of the equation:

$$d = \frac{\Delta t C}{2}$$

where $\Delta t$ is the two-way travel time and C is the velocity of propagation of electromagnetic waves. In practice it is normal to calibrate the time base in distance so that the range may be read directly from the tube face or from the control of a suitable electronic strobe device.

The pulse expander 2 and the pulse compressor 8 (see FIGURE 2) are similar units, differing only in minor adjustments made for purposes of phase compensation (as described above). The second unit thus performs the reverse function of the first. These units are, in fact, delay line correlators where a time varying quantity $g(t)$ is represented by the distribution of a number of transducers along a magnetostrictive delay member.

In the case of the pulse expander 2 the single transducer 26 will produce a coherent output signal of the function $g(t)$ when a short duration pulse is applied to the multiple transducer 25.

When the signal $r(t)$ is applied to the single transducer 34 towards the opposite end of the delay member 31, the output of the multiple transducer 35 is the cross-correlation function of signals $g(t)$ and $r(t)$. This output will appear on the oscilloscope as a short duration pulse if $g(t)$ is a swept frequency or a truly random signal.

If the signals $g(t)$ and $r(t)$ are coherent in phase the pulse will be symmetrical in character about a central maximum. If the signals $g(t)$ and $r(t)$ are such that their power spectra are substantially rectangular, the envelope of the pulse will be of $$\frac{\sin x}{x}$$

form and the —4 db points will be separated by the reciprocal of the bandwidth. Phase distortion on one of the signals will produce a distorted pulse at a reduced amplitude. The reduction of phase distortion has been discussed above.

It is important to note that both the correlators, i.e. the pulse compressor 2 and the pulse expander 8, are subject to delay variations due to changes in temperature. Such errors can be avoided by ensuring that both the correlators are maintained at the same temperature or are subject to the same variations in temperature. This can be done by mounting the units in a common chamber and by arranging for the power dissipated in the two units to be equal.

As has been mentioned, the responder B can be arranged to transmit at a frequency which differs only slightly from that of the signal which it receives from the interrogator A, or at a frequency which is very different from that of the latter. Thus, the responder may comprise a radio receiver, such as that indicated at 15 in FIGURE 1, which triggers off a separate transmitter, such as 17, in order to transmit a return signal 19 at any desired radio frequency.

FIGURE 3 shows another arrangement in which the responder B includes a receiver of the tuned radio frequency type; it comprises a radio frequency amplifier 51, which is tuned to the carrier frequency of the incoming signal received by the antenna 52. The output from the amplifier 51 is rectified by a detector 53, the output of which will correspond to the received signal; it will, therefore, have frequencies in the range $f_1$ to $f_2$. The rectified signal is amplified in a radio frequency amplifier 54, from which it is fed to a power amplifier 55, by which latter it is transmitted through the aerial 56 (which corresponds to the antenna 18 of FIGURE 1) back to the interrogator.

FIGURE 4 shows another form of responder B utilising a receiver of the superheterodyne type. This comprises a tuned radio frequency amplifier 61 to which the signal received by the antenna 62 is supplied and the output of which is fed to a mixer 63, which latter is connected to a local oscillator 64. The resulting intermediate frequency signal from the mixer 63 is amplified by an I.F. amplifier 65, from which it is fed to a power amplifier 66. This transmits it through the aerial 67 back to the interrogator. The transmission from the responder of FIGURE 4 will thus be at the intermediate frequency of the superheterodyne receiver, which will be modulated at the signal frequencies.

FIGURE 5 shows yet another form of responder using a superheterodyne type receiver. This responder comprises an RF amplifier 71, which is connected to the aerial 72, a mixer 73, a local oscillator 74 and an I.F. amplifier 75, all of which may be similar to the corresponding parts 61 to 65 shown in FIGURE 4. The output of the I.F. amplifier 75 is, however, rectified by a second detector 76, the output of which is fed to a power amplifier 77 by which it is transmitted from the aerial 78 back to the interrogator. As in the case of the responder of FIGURE 3 the reply signal will be at the frequency (or rather range of frequencies) of the expanded signal.

Although the present invention has been described as applied to radio ranging in which the signals from both the interrogator and from the responder are radio frequencies, the invention is not limited to such arrangements. Electromagnetic waves at frequencies other than radio frequencies or sonic signals could be used for either the interrogator signal or the responder signal or for both of these. A particularly advantages arrangement, especially when relatively short distances are to be measured, would be to use a radio frequency signal from the interrogator to trigger off a responder which would transmit back a sonic signal (preferably at ultrasonic frequencies). These responder signals could be transmitted through the air or through water as illustrated in FIG. 9. In either case the use of a sonic signal, instead of an electromagnetic wave signal, in at least one direction offers the advantage of allowing much shorter distances to be measured than is possible if only electromagnetic wave signals are used.

The invention has been described using magnetostrictive devices for expanding and compressing the pulses, but other forms of correlating device, such as are described in our aforesaid British and United States patent applications could also be used. For example, magnetic correlators could be used wherever time conditions permit, such as, for example, when sonic signals are used in at least one direction.

Another possible method of pulse compression and expansion is described by J. E. May Jr., of the Bell Telephone Laboratories, in a paper which was presented to the Electronic Components Conference, in Washington, D.C., U.S.A. on May 9, 1962. The function $g(t)$ can be generated by injecting a pulse, of appropriate spectrum, into one end of a dispersive delay line whose delay varies linearly with frequency. A second transducer at the opposite end of the delay line then produces an oscillating voltage whose frequency varies from $f_1$ to $f_2$ and in which the variation is linear with time.

Restoration of this pulse to one of short duration can then be made:

(1) By constructing a dispersive delay line where the delay with frequency has the opposite sign, or (2) By modulating $r(t)$ with the output of a local oscillator tuned to twice the centre frequency, by selecting the lower side band, and by injecting the resulting signal into a delay line identical with the one which made $g(t)$.

Where the delay line does not introduce a frequency dispersion which varies linearly with time the first method is more suitable.

We claim:

1. Interrogator apparatus for use in conjunction with a responder in a system employed for measuring distances, said apparatus comprising means for generating a pulse, means for expanding said pulse in order to produce an expanded pulse having a characteristic which varies according to a predetermined non-repetitive pattern, means for transmitting a first signal derived at least in part from said expanded pulse for reception by the responder to cause the latter to transmit a return signal having a characteristic pattern related to that of said first signal, means for compressing said return signal as received by said interrogator said compressing means including means for cross correlating said return signal with a pattern representing at least a portion of the expanded pulse and comprising a magnetostrictive member, input transducer means responsive to said return signal and coupled to said member to produce strains therein, and means including output transducer means coupled to said member for developing a compressed return signal, at least one of said transducer means being adjustable along said member to compensate for phase shifts, and means responsive to the time interval between said pulse and the resulting compressed return signal for measuring the distance between said interrogator and said responder.

2. Interrogator apparatus according to claim 1, which includes a radio transmitter for transmitting said first signal in the form of a carrier wave modulated with said expanded pulse signal.

3. Interrogator apparatus according to claim 2, which includes a radio receiver for receiving said return signal.

4. Interrogator apparatus according to claim 1, wherein the means for expanding said pulse comprise a pair of spaced transducers, means for feeding said pulse to one of said transducers, and means for conveying energy along a path from this transducer to the other, one of said transducers including a plurality of transducing elements arranged according to a predetermined pattern with respect to said path such that a signal expanded in accordance with said pattern is produced by said other transducer.

5. Interrogator apparatus according to claim 4, wherein the means for conveying energy between said transducers includes a fixed member extending between said transducers for conveying energy from one transducer to the other in the form of mechanical waves.

6. Interrogator apparatus according to claim 4, wherein the means for conveying energy between said transducers includes a recording medium and means for passing said recording medium between said transducers.

7. Interrogator apparatus according to claim 1, wherein one of said transducers includes a plurality of transducing elements arranged according to a predetermined pattern with respect to said path such that a signal compressed in accordance with said pattern is produced by said other transducer.

8. Interrogator apparatus according to claim 7, wherein in means is provided for conveying energy between such transducers the last named means including a recording medium and means for passing said recording medium between said transducers.

9. Interrogator apparatus according to claim 1, which includes means for displaying a zero time mark by feeding a proportion of said expanded pulse signal to said return signal compressing means.

10. A system for measuring distances by radio ranging, said system comprising interrogator apparatus as specified in claim 1, which apparatus is arranged to transmit said expanded pulse signal as a modulated radio signal, and a responder, which responder includes a radio receiver for receiving said signal and a transmitter for transmitting a return signal having a characteristic corresponding to that of said expanded pulse signal as received by said responder.

11. A system according to claim 10, wherein said transmitter is a radio transmitter.

12. A system according to claim 11, wherein said receiver includes a local oscillator and a mixer for producing a modulated intermediate frequency signal and wherein said transmitter is arranged to transmit at said modulated intermediate frequency.

13. A system according to claim 10, wherein said transmitter is arranged to transmit said return signal at the modulation frequencies of the radio frequency signal received by said receiver.

(References on following page)

References Cited by the Examiner

UNITED STATES PATENTS

| | | | |
|---|---|---|---|
| 684,706 | 10/1901 | Mundy | 343—103 |
| 2,768,372 | 8/1956 | Green | 343—100.7 |
| 2,941,202 | 6/1960 | Harris et al. | 343—100.7 |
| 3,175,214 | 3/1965 | Ramsay | 343—13 |
| 3,199,106 | 8/1965 | Karr | 343—17.2 |

OTHER REFERENCES

Ohman: Getting High Range Resolution with Pulse Compression Radar, Electronics, Oct. 7, 1960.

CHESTER L. JUSTUS, Primary Examiner.

R. E. KLEIN, L. H. MYERS, R. D. BENNETT, Assistant Examiners.